3,287,311
POLYIMIDE CONTAINING TiO₂, ARTICLES, AND PROCESS OF MAKING
Walter Murray Edwards, Wilmington, Del., assignor to E. I. du Pont de Nemours and Company, Wilmington, Del., a corporation of Delaware
No Drawing. Filed Jan. 3, 1963, Ser. No. 249,127
11 Claims. (Cl. 260—37)

This application is a continuation-in-part of my application Serial No. 169,120 filed January 26, 1962, now United States Patent No. 3,179,634, which was a continuation-in-part of my application Serial No. 803,347 filed April 1, 1959, now abandoned.

This invention relates to a method for improving the dielectric constant of resinous material without reducing the dissipation factor to any substantial extent.

In the prior art, the dielectric constants of resinous compositions have been improved by physically mixing the resin with dielectric particles. However, to provide effective mixing usually requires the use of the resin in the molten state or the use of a plasticizer for the resin. Maintaining the resin in the molten state requires heat which, in turn, may have an adverse effect on the dielectric particles. Using a plasticizer adds the expense of the plasticizer and the expense of the step in which the plasticizer is removed.

Furthermore, in the preparation of mixtures of polyimide resins with dielectric particles, the use of heat or the use of a plasticizer is not easily possible. The greatest advantage of polyimide resins stems from their resistance to heat and their resistance to chemicals. In other words, the same outstanding physical and chemical properties that would make these particle-containing polymers extremely useful in the form of shaped articles such as films, filaments, tubing, etc., make it extremely difficult to obtain these articles in the first instance.

The object of the present invention is to form particle-containing polyimide shaped articles. Other objects will appear hereinafter.

The objects are accomplished by first forming a composition containing at least one polyamide-acid having an inherent viscosity of at least 0.1, preferably 0.3–5.0, having blended therein inert, dielectric particles, e.g. particles of titanium dioxide, barium titanate, potassium titanate, magnesium sulfate, asbestos, magnetic iron oxide (Fe₃O₄), ferric oxide (Fe₂O₃), aluminum powder, potassium sodium tartrate, ammonium dihydrogen phosphate, amorphous silica, and amorphous alumina, preferably barium titanate; then shaping the particle-containing polyamide-acid composition into a structure; and, thereafter, converting the structure to a polyimide structure containing the particles.

The process may be divided into four steps:
(1) Preparing the polyamide-acid.
(2) Preparing a composition of the particle/polyamide-acid mixture.
(3) Shaping the composition into a useful structure.
(4) Converting the structure to a particle-containing polyimide structure.

Each of these steps will be discussed separately in subsequent portions of this specification.

PREPARING POLYAMIDE-ACID COMPOSITIONS

The process for preparing the polyamide-acid composition involves reacting at least one organic diamine having the structural formula

wherein R' is a divalent radical containing at least 2 carbon atoms, the two amino groups of said diamine each attached to separate carbon atoms of said divalent radical; with at least one tetracarboxylic acid dianhydride having the structural formula

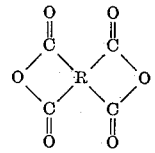

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature sufficient to provide a shapeable composition of polyamide-acid.

It should be understood that it is not necessary that the polymeric component of the composition be composed entirely of the polyamide-acid. This is particularly true since conversion to the polyimide is contemplated subsequent to shaping the composition. To retain its shapeability, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of sufficient polyamide-acid to be shapeable will vary but can be determined by a simple test by any person of ordinary skill in the art. However, to obtain the maximum inherent viscosity, i.e. maximum degree of polymerization, for any particular combination of diamine, dianhydride, solvent, etc., and thus produce shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

Inherent viscosity =
$$\frac{\text{natural logarithm } \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05–40% of the polymeric component. The viscous solution of the polymeric composition containing polyamide-acid in the polymeric component dissolved in the solvent may be used as such for forming shaped structures.

The starting materials for forming the products of the present invention are organic diamines and tetracarboxylic acid dianhydrides. The organic diamines are characterized by the formula: $H_2N$—R'—$NH_2$, wherein R', the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The preferred R' groups in the diamines are those containing at least 6 carbon atoms characterized by benzenoid unsaturation. Such R' groups include

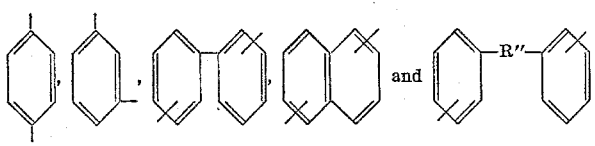

wherein R'' is selected from the group consisting of carbon in an alkylene chain having 1–3 carbon atoms, —O—, silicon in

and

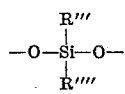

phosphorus in

and

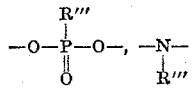

—S—, and —$SO_2$— wherein R''' and R'''' are alkyl or aryl. Among the diamines which are suitable for use in the present invention are: meta-phenylene diamine; para-phenylene diamine; 4,4'-diamino-diphenyl propane; 4,4'-diamino-diphenyl methane; benzidine; 4,4'-diamino-diphenyl sulfide, 4,4'-diamino-diphenyl sulfide; 3,3'-diamino-diphenyl sulfone; 4,4'-diamino-diphenyl ether; 2,6-diamino-pyridine; bis-(4-amino-phenyl)diethyl silane; bis-(4-amino-phenyl) diphenyl silane; bis-(4-amino-phenyl)-N-methylamine; 1,5-diamino naphthalene; 3,3'-dimethyl-4,4'-diamino-biphenyl; 3,3'-dimethoxy benzidine; 2,4-bis-(beta-amino-t-butyl)toluene; bis-(para-beta-amino-t-butylphenyl) ether; para-bis-(2-methyl-4-amino-pentyl) benzene; para-bis-(1,1-dimethyl-5-amino-pentyl)benzene; m-xylylene diamine; p-xylylene diamine; bis-(para-aminocyclohexyl) methane; hexamethylene diamine; heptamethylene diamine; octamethylene diamine; nonomethylene diamine; decamethylene diamine; 3-methylheptamethylene diamine; 4,4-dimethylheptamethylene diamine; 2,11-diamino-dodecane; 1,2 - bis - (3 - amino-propoxy) ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,1,2-diamino-octadecane; 2,5-diamino-1,3,4-oxadiazole;

$H_2N(CH_2)_3N(CH_3)(CH_2)_3NH_2$; 3,3'-dichloro-benzidine; bis-(4-amino-phenyl) ethyl phosphine oxide; bis-(4-aminophenyl) phenyl phosphine oxide; bis-(4-amino-phenyl)-N-phenylamine; and mixtures thereof.

The tetracarboxylic acid dianhydrides are characterized by the following formula:

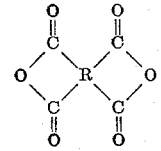

wherein R is a tetravalent organic radical selected from the group consisting of aromatic, aliphatic, cycloaliphatic, heterocyclic, combination of aromatic and aliphatic, and substituted groups thereof. However, the preferred dianhydrides are the aromatic tetracarboxylic acid dianhydrides, those in which the R groups have at least one ring of 6 carbon atoms characterized by benzenoid unsaturation (alternate double bonds in a ring structure), and particularly those aromatic dianhydrides wherein the 4 carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

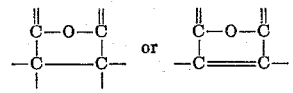

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis (3,4-dicarboxyphenyl) sulfone dianhydride; 3,4,9,10-perylene tetracarboxylic dianhydride; bis(3,4-dicarboxyphenyl) ether dianhydride; ethylene tetracarboxylic dianhydride; naphthalene-1,2,4,5-tetracarboxylic dianhydride; naphthalene-1,4,5,8-tetracarboxylic dianhydride; decahydronaphthalene-1,4,5,8-tetracarboxylic dianhydride; 4,8-dimethyl-1,2,3,5,6,7-hexahydronaphthalene-1,2,5,6-tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8 - tetracarboxylic dianhydride; phenanthrene-1,8,9,10-tetracarboxylic dianhydride; cyclopentane-1,2,3,4-tetracarboxylic dianhydride; pyrrolidine-2,3,4,5-tetracarboxylic dianhydride; pyrazine-2,3,5,6-tetracarboxylic dianhydride; 2,2-bis(2,3-dicarboxyphenyl) propane dianhydride; 1,1,-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; bis(3,4-dicarboxyphenyl) sulfone dianhydride; benzene-1,2,3,4-tetracarboxylic dianhydride; 1,2,3,4-butane tetracarboxylic dianhydride; thiophene-2,3,4,5-tetracarboxylic dianhydride; 3,4,3',4'-benzophenone tetracarboxylic dianhydride; etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methylformamide, butyrolactone and N-acetyl-2-pyrrolidone. The solvents can be used alone, in combinations of solvents, or in combination with poor solvents such as benzene, benzonitrile, dioxane, xylene, toluene and cyclohexane.

PREPARING A COMPOSITION OF THE PARTICLE/POLYAMIDE-ACID MIXTURE

The most useful particles for use in the present invention are particles of titanium dioxide, barium titanate, potassium titanate, magnesium sulfate, asbestos, magnetic iron oxide ($Fe_3O_4$), ferric oxide ($Fe_2O_3$), aluminum powder, potassium sodium tartrate, ammonium dihydrogen phosphate, non-abrasive amorphous alumina and non-abrasive amorphous silica as in glass microballoons, preferably barium titanate. The class of non-abrasive silica also includes the various forms of "Ludox" colloidal silicas; "Celite" diatomaceous silica (largely $SiO_2$, plus $Al_2O_3$, $Fe_2O_3$, $TiO_2$, CaO and MgO); Synthamica (a synthetic mica made from a stoichiometric ratio of $SiO_2$, $Al_2O_3$, MgO, potassium silica fluoride and potash feldspar); "Hi-Sil" silica (a hydrated silica of high purity and very fine particle size); "Cab-O-Sil" colloidal silica; and sepiolite (meerschaum; a hydrated magnesium silicate). Some forms of non-abrasive alumina are boehmite (a form of bauxite, $Al_2O_3H_2O$); "Celite" diatomaceous silica (see above); and "Bentone" 18 (a magnesium/calcium/aluminum/silicon complex oxide attached electrovalently to an organic ammonium cation).

The particles may be added at any stage in the preparation of the polyamide-acid. The particles may be added to the organic solvent prior even to the introduction of the diamine and the dianhydride. They also may be added to the solution in the organic solvent of one or both of the reactants before, during or after the formation of the polyamide-acid. Preferably, the particles are added to a solution of the polyamide-acid.

The particles may represent anywhere from 5% to 90%, preferably 5-70%, by weight, of the blend of particles and polymer. The use of less than 5% does not provide a significant increase in dielectric constant. The use of amounts greater than 90% and with some polyimides greater than about 70% (about 200% based on the weight of the polyimide) tends to weaken the product and does limit its usefulness. Where the composition is used as a coating composition, the coating composition may be pigmented with such compounds as titanium dioxide in amounts of 5-200% by weight of the polymer.

SHAPING THE COMPOSITION INTO A USEFUL STRUCTURE

The polyamide-acid composition containing the particles dispersed therein so that the total solids represent anywhere from 5% to 90% of the solution is next shaped into a useful article. Shaping may be accomplished by extruding the solution through an appropriate orifice or slot to form filaments, rods, flat sheets, tubing or the like. Alternatively, the composition may be cast onto flat or curved surfaces to form sheets, films, etc., or placed in molds of the desirable shape. The composition may also be coated on to insulating substrates, preferably surface-modified polyimide films.

CONVERTING TO A PARTICLE-CONTAINING POLYIMIDE ARTICLE

The shaped articles composed of a substantial amount of the polyamide-acid and particles are converted to the respective, polyimide shaped articles by any one or more of several processes. One process comprises converting the polyamide acid units of the following structural formula:

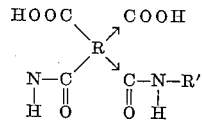

wherein → denotes isomerism, to polyimide by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion, if the polyimide is further heated to a temperature of 300°–500° C. for a short interval (15 seconds to 2 minutes), improvements in the thermal and hydrolytic stabilities of the polyimide structure are obtained as well as an increase in inherent viscosity.

A second process for converting polyamide-acid to the corresponding polyimide is a chemical treatment and involves treating the polyamide-acid composition with a dehydrating agent alone or in combination with a tertiary amine, e.g. acetic anhydride or an acetic anhydride-pyridine mixture. The polyamide-acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. The amine functions as a catalyst for the action of the cyclizing agent, the anhydride.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydride and ketene. Ketenes are regarded as anhydrides of carboxylic acids, (ref. Bernthsen-Sudborough, textbook of Organic Chemistry, Van Nostrand, 1935, page 861 and Hackh's Chemical Dictionary, Blakiston, 1953, page 468) derived from drastic dehydration of the acids.

The aromatic monobasic acid anhydrides include the anhydride of benzoic acid and those of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratric acid; trimethoxy benzoic acid; alpha- and beta-naphthoic acids; and biphenylcarboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine may be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts.

As a third process of conversion, a combination treatment may be used. The polyamide-acid may be partially converted to the polyamide in a chemical conversion treatment and then cyclization to the polyimide may be completed by subsequent heat treatment. The conversion of the polyamide-acid to the polyimide in the first step can be limited if it is desired to shape the composition at this stage. After shaping, the completion of the cyclization of the polyimide/polyamide-acid may be accomplished.

The presence of polyimide is evidenced by its insolubility in cold basic reagents as opposed to the rapid solubility of polyamide-acid. Its presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption band appear, a doublet at ca. 5.64 and 5.89 microns and a peak at 13.85 microns. When conversion is completed, the characteristic polyimide band predominates.

The compositions of this invention have improved dielectric constants with only slight to moderate sacrifices in dissipation factor. By having a high dielectric constant without an accompanying increase in dissipation factor, the capacitor may be made quite small. They are useful, therefore, as insulating layers in capacitors.

The invention will be more clearly understood by referring to the examples which follow. These examples, which illustrate specific embodiments of the present invention, should not be construed to limit the invention in any way.

In the examples, volume resistivities of the filled polymers are measured by a method similar to that of ASTM method D-257-54T, using equipment modified in conventional ways to provide for measuring low resistivities:

A piece of film 2.5 x 3.5 cm. is used for the test. Silver electrodes are applied on top and bottom of the film to a distance of 0.5 cm. from each of the long ends. This gives a square of film 2.5 cm. x 2.5 cm. between the electrodes. The resistance between the electrodes is then measured by attaching the leads from a Simpson meter to each end of the film. This gives the resistance in ohms/square. The volume resistivity is found by multiplying this value by the film thickness expressed in centimeters to give the units ohm-cm.

Methods for determining dielectric constant and dissipation factor are described in an ASTM method entitled "Tests for Dielectric Constant of Electrical Insulation (D150)".

Example 1

A 10% by weight solution of a polyamide-acid having an inherent viscosity of 2.19 was made from 52.14 g. of pyromellitic dianhydride and 47.86 g. of 4,4'-diaminodiphenyl ether in N,N'-dimethylacetamide. To portions of this solution in a Hobart mixer were added enough barium titanate crystals to give 10% and 50% by weight (based on the polymer plus filler). The mixtures were cast onto glass plates by means of a doctor knife and the plates were immersed immediately in baths consisting of 50% by weight of acetic anhydride and 50% by weight of pyridine. The films set to tough gels and after a few minutes were stripped from the plates and placed in a benzene bath for about 15 minutes to extract acetic acid, acetic anhydride and pyridine. The gel films were then clipped taut onto stainless steel frames and allowed to air-dry for a few minutes. The frames were then placed in an oven at room temperature and heated to 300° C. over 45 minutes. After 1 hour at 300° C. the films were cut from the frames. Their thicknesses were 1.6 mils (10% filling) and 2.9 mils (50% filling).

Both of these films were fairly stiff and tough, having densities of 1.479 and greater than 1.59, respectively. Their electrical properties were as follows:

|  | Filling | |
| --- | --- | --- |
|  | 10% | 50% |
| Volume resistivity (ohm-cm.): | | |
| 23° C. ($10^{15}$–$10^{18}$) | $6 \times 10^{17}$ | $9 \times 10^{16}$ |
| 200° C. ($10^{14}$–$10^{15}$) | $9 \times 10^{13}$ | $3 \times 10^{14}$ |
| Dielectric constant (1,000 c.p.s.): | | |
| 23° C. (3.6)* | 5.1 | 7.4 |
| 200° C. (2.9)* | 4.2 | 6.2 |
| Dissipation factor (1,000 c.p.s.): | | |
| 23° C. (0.0016)* | 0.0035 | 0.0049 |
| 200° C. (0.0007)* | 0.0014 | 0.0025 |

*Values in parentheses are those for unfilled polyimide film.

Since a 10 fold increase in dissipation factor can be tolerated for many applications, these films are quite useful.

Example 2

"Hi-Sil" silica (8.3 g., vacuum dried 16 hours at 150° C.) was mixed thoroughly into 780 grams of a polyamide acid solution prepared as described in Example 1. This mixture was cast into a film which was converted to polyimide and dried according to the above procedure. The properties of the resulting 3.4 mil film were as follows:

| Property | 23° C. | 200° C. |
| --- | --- | --- |
| Modulus (K p.s.i.) | 195 | 131. |
| Elongation (%) | 122 | 141. |
| Tenacity (K p.s.i.) | 10.2 | 5.7. |
| Pneumatic Impact | 1.9 kg. cm./mil. | |
| Tear Strength | 7 g./mil. | |
| Density | 1.218 g./cm.³ | |
| Dielectric Constant (1,000 c.p.s.) | 9.2 (3.6)* | 5.0 (2.9).* |
| Dissipation factor (1,000 c.p.s.) | 0.022 (0.0016) | 0.022 (0.0007). |
| Volume resistivity (ohm-cm.) | $2 \times 10^{17}$ ($10^{15}$–$10^{18}$) | $2 \times 10^{14}$ ($10^{14}$–$10^{15}$). |

*Values in parentheses are those of unfilled polyimide film.

Example 3

A 2.5 mil polyimide film containing 10% by weight of "Cab-O-Sil" silica was prepared by the procedure of Example 1. This film had a density of 1.3 and a zero strength temperature of 875° C., compared to 810–820° C.

for unfilled polyimide film. The electrical properties of the filled film were:

|  | 23° C. | 200° C. |
|---|---|---|
| Volume resistivity (ohm-cm.) | $5 \times 10^{16}$ | $4 \times 10^{13}$ |
| Dielectric constant (1,000 c.p.s.) | 5.2 | 4.0 |
| Dissipation factor (1,000 c.p.s.) | 0.032 | 0.0016 |

*Example 4*

A 4.7 mil polyimide film (density 1.417) containing 10% by weight of silica gel was prepared by the procedure of Example 1. The electrical properties were as follows:

|  | 23° C. | 200° C. |
|---|---|---|
| Volume resistivity (ohm-cm.) | $10^9$–$10^{11}$ | $10^{13}$ |
| Dielectric constant (1,000 c.p.s.) | 10.5 | 8.5 |
| Dissipation factor (1,000 c.p.s.) | 0.0031 | 0.0071 |

*Example 5*

A solution of polyamide-acid was made by the addition of 52.14 g. of pyromellitic dianhydride to 47.86 g. of 4,4'-diaminodiphenyl ether dissolved in 950 ml. of dimethylacetamide. After stirring 2 hours 11 g. of titanium dioxide was added and the mixture was stirred an additional 30 minutes. This solution was then degassed by means of a vacuum and cast onto a glass plate by means of a doctor knife. Immediately after casting, the plate was placed in a tray containing equal volumes of acetic anhydride and pyridine to convert the polyamide-acid into polyimide films. After about 5 minutes the gel film was removed and placed in a tray containing benzene (80%), pyridine (10%) and acetic anhydride (10%). The washed film was then clipped tautly onto a frame and placed in an oven at room temperature. The oven was heated to 300° C. in about 45 minutes and then left at 300° C. for one hour. After this time, the dry, filled polyimide film was cut off of the frame. Its density was 1.454, thickness 1.8 mils, and its zero strength temperature was 850° C. Its electrical properties were:

|  | 23° C. | 200° C. |
|---|---|---|
| Volume resistivity (ohm-cm.) | $10^{15}$ | $9 \times 10^{14}$ |
| Dielectric constant (1,000 c.p.s.) | 5.2 | 4.4 |
| Dissipation factor (1,000 c.p.s.) | 0.0027 | 0.0015 |

*Example 6*

When magnesium sulfate was loaded into a polyimide by the procedure of Example 1, the 4.4 mil film had the following properties:

Density ------------------------------------ 1.455
Zero strength temperature ------------------ 840

|  | 23° C. | 200° C. |
|---|---|---|
| Volume resistivity (ohm-cm.) | $2 \times 10^{16}$ | $2 \times 10^{14}$ |
| Dielectric constant (1,000 c.p.s.) | 9.0 | 7.2 |
| Dissipation factor (1,000 c.p.s.) | 0.0088 | 0.0035 |

*Example 7*

A 1.3 mil polyimide film containing 10% by weight of boehmite was prepared by the procedure of Example 1. Its density was 1.404, and its zero strength temperature was 920° C. The 300° C. aging value was 9–10 weeks, compared to 4.5–7 weeks for unfilled polyimide film.

|  | 23° C. | 200° C. |
|---|---|---|
| Volume resistivity (ohm-cm.) | $5 \times 10^{17}$ | $10^{14}$ |
| Dielectric constant (1,000 c.p.s.) | 5.6 | 4.0 |
| Dissipation factor (1,000 c.p.s.) | 0.010 | 0.029 |

*Example 8*

A 1.9 mil polyimide film filled with 10% by weight of potassium titanate was prepared by the procedure of Example 1. This film had a density of 1.450 and a zero strength temperature of 870° C. The electrical properties were:

|  | 23° C. | 200° C. |
|---|---|---|
| Volume resistivity (ohm-cm.) | $3 \times 10^{17}$ | $2 \times 10^{13}$ |
| Dielectric constant (1,000 c.p.s.) | 6.1 | 5.0 |
| Dissipation factor (1,000 c.p.s.) | 0.0096 | 0.0041 |

*Example 9*

Repeating the procedure of Example 1, a 2.3 mil polyimide film containing 50% by weight of bentonite was prepared. Its density was above 1.59 and its zero strength temperature was 930° C. Other outstanding properties were:

|  | 23° C. | 200° C. |
|---|---|---|
| Modulus (K p.s.i.) | 590 | 380 |
| Volume resistivity (Ohm-cm.) | $10^{15}$ | $5 \times 10^{13}$ |
| Dielectric constant (1,000 c.p.s.) | 8.7 | 6.4 |
| Dissipation factor (1,000 c.p.s.) | 0.016 | 0.034 |

*Example 10*

A 2.0 mil film containing 10% by weight of asbestos, prepared by the procedure of Example 1, had the amazing zero strength of 940° C. Its dielectric constants at 23° C. and 200° C. were 6.0 and 4.8, respectively, and its dissipation factor was 0.016 and 0.011, respectively. In addition to its value is the dielectric in a capacitor, this product is very useful as a heavy duty clutch facing, brake lining and bearing material.

*Example 11*

Films having similar properties to those described above are produced by the procedure of Example 1 when an equimolar amount of each of the following diamines is substituted for 4,4'-diaminodiphenyl ether: m-phenylenediamine, p-phenylenediamine, 4,4'-diaminodiphenyl methane, 4,4'-diaminodiphenyl sulfide, 4,4'-diaminodiphenyl sulfone, 2,2-bis(4-aminophenyl) propane, benzidine, and 1,5-diaminonaphthalene.

*Example 12*

Another set of tough films having improved dielectric constant is produced by substituting each of these dianhydrides in equimolar amount for the pyromellitic dianhydride of Example 1: 2,3,6,7-naphthalene tetracarboxylic dianhydride; 3,3',4,4'-diphenyl tetracarboxylic dianhydride; 2,2 - bis(3,4 - dicarboxyphenyl) propane dianhydride; perylene-3,4,9,10-tetracarboxylic dianhydride; bis(3,4-dicarboxyphenyl) ether dianhydride; thiophene-2,3,4,5-tetracarboxylic dianhydride and 3,4,3',4'-benzophenone tetracarboxylic dianhydride.

*Example 13*

A 3.0 mil polyimide film containing 50% by weight of ferric oxide, and prepared by the procedure of Example 1, had a density above 1.59 and a higher zero strength temperature (860° C.) than unfilled polyimide film. Its electrical properties were as follows:

|  | 23° C. | 200° C. |
|---|---|---|
| Volume resistivity (ohm-cm.) | $10^{16}$–$10^{17}$ | $6 \times 10^{13}$ |
| Dielectric constant (1,000 c.p.s.) | 6.6 |  |
| Dissipation factor (1,000 c.p.s.) | 0.016 | 0.10 |

*Example 14*

A similarly prepared 7 mil polyimide film containing 50% by weight of $Fe_3O_4$ had the spectacular dielectric constants of 17.8 and 15.7 at 23° C. and 200° C., respectively, making it useful for making a magnetic tape for use at high temperatures.

*Example 15*

Polyimide film containing 5 and 20% by weight of "Eccospheres" (glass microballoons), prepared as described in Example 1, had densities of 1.28 and less than 0.96, respectively, and zero strength temperatures of 850° C. and 880° C., respectively. Their electrical properties were as follows:

|  | 5% | 20% |
|---|---|---|
| Volume resistivity (ohm-cm.) | | |
| 23° C. | $2 \times 10^{13}$ | $4 \times 10^{11}$ |
| 200° C. | $3 \times 10^{13}$ | $2 \times 10^{12}$ |
| Dielectric constant (1,000 c.p.s.) | | |
| 23° C. | 7.0 | 13.0 |
| 200° C. | 5.6 | 8.4 |
| Dissipation factor (1,000 c.p.s.) | | |
| 23° C. | 0.017 | 0.066 |
| 200° C. | 0.017 | 0.10 |

*Example 16*

When barium titanate is used in the procedure of Example 1 in sufficient amount to give a polyimide film containing 90% by weight of filler, the dielectric constant of the product is greater than 7.5 at 23° C.

What is claimed is:

1. A process which comprises mixing at least one diamine having the structural formula $H_2N-R'-NH_2$ wherein R' is a divalent radical selected from the group consisting of

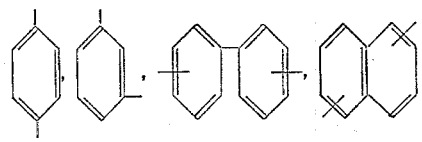

and

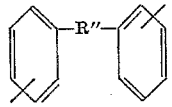

where R" is selected from the group consisting of an alkylene chain having 1–3 carbons atoms, —O—, —S—, —SO$_2$—,

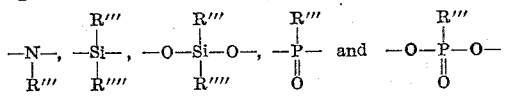

where R''' and R'''' are selected from the group consisting of alkyl and aryl; with at least one tetracarboxylic acid dianhydride having the structural formula

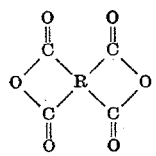

wherein R is a tetravalent organic radical containing at least 2 carbon atoms, no more than 2 carbonyl groups of said dianhydride attached to any one carbon atom of said tetravalent radical; in a solvent for at least one of said diamine and said dianhydride under conditions to form a polyamide-acid; adding titanium dioxide particles to form a shapeable polymeric composition having said titanium dioxide particles dispersed uniformly therein; shaping said composition into a shaped article; and converting the polymer in said polymeric composition to polyimide.

2. A process as in claim 1 wherein said diamine is 4,4′-diamino-diphenyl ether.

3. A process as in claim 1 wherein said dianhydride is pyromellitic dianhydride.

4. A process as in claim 1 wherein said solvent is dimethylacetamide.

5. A process as in claim 1 wherein said converting is by heating.

6. A process as in claim 1 wherein said converting is by treating with an anhydride selected from the group consisting of lower fatty acid anhydrides and aromatic monobasic acid anhydrides.

7. A process as in claim 1 wherein said converting is by treating with a mixture of acetic anhydride and pyridine.

8. A resinous material comprising a polyamide-acid having titanium dioxide particles dispersed therethrough, said polyamide-acid having the formula

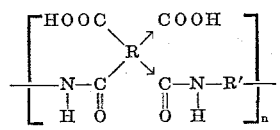

wherein the arrows denote isomerism; R is a tetravalent organic radical containing at least 2 carbon atoms, no more than 2 carbonyl groups of each polyamide-acid unit being attached to any one carbon atom of said tetravalent radical; R' is a divalent radical selected from the group consisting of

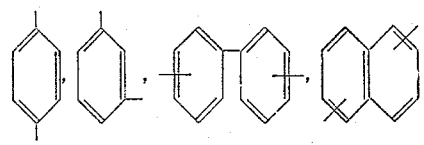

and

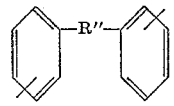

where R" is selected from the group consisting of an alkylene chain having 1–3 carbon atoms, —O—, —S—, —SO$_2$—,

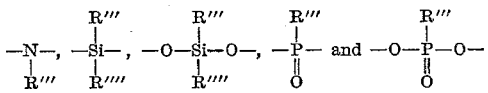

where R''' and R'''' are selected from the group consisting of alkyl and aryl; and $n$ is an integer sufficient to provide an inherent viscosity of at least 0.1.

9. A resinous material as in claim 8 in the form of a self-supporting film.

10. A resinous material comprising a polyimide having titanium dioxide particles dispersed therethrough, said polyimide having the formula

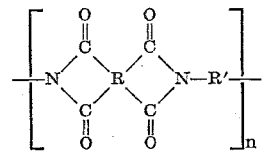

where R is a tetravalent organic radical containing at least 2 carbon atoms, no more than 2 carbonyl groups of each polyimide unit being attached to any one carbon atom of said tetravalent radical; R' is a divalent radical selected from the group consisting of

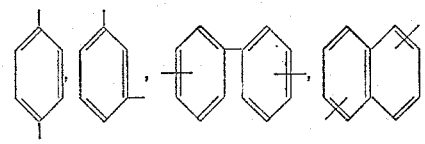

and

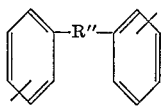

where R″ is selected from the group consisting of an alkylene chain having 1–3 carbon atoms, —O—, —S—, —SO₂—,

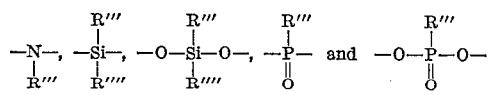

where R‴ and R″″ are selected from the group consisting of alkyl and aryl; and $n$ is an integer sufficient to provide an inherent viscosity of at least 0.1.

11. A resinous material as in claim 10 in the form of a self-supporting film.

References Cited by the Examiner

UNITED STATES PATENTS

| | | | |
|---|---|---|---|
| 2,867,609 | 1/1959 | Edwards et al. | 260—78 |
| 2,895,936 | 7/1959 | Archer et al. | 260—78 |
| 2,944,993 | 7/1960 | Brebner et al. | 260—78 XR |
| 2,959,572 | 11/1960 | Blanchette | 260—78 |
| 3,037,966 | 6/1962 | Chow et al. | 260—78 |
| 3,043,843 | 7/1962 | Koch | 260—37 |
| 3,179,634 | 4/1965 | Edwards | 260—78 |
| 3,194,782 | 7/1965 | Devaney et al. | 260—40 |

OTHER REFERENCES

Delmonte: "Metal-Filled Plastics," Reinhold, 1961, pages 195, 196, and 197.

MORRIS LIEBMAN, *Primary Examiner.*

ALAN LIEBERMAN, *Examiner.*

A. H. KOECKERT, *Assistant Examiner.*